United States Patent
Peng et al.

(10) Patent No.: US 10,121,496 B1
(45) Date of Patent: Nov. 6, 2018

(54) HEAT-ASSISTED MAGNETIC RECORDING HEAD HAVING PEG COUPLER AND PLASMONIC PAD

(71) Applicant: Seagate Technology LLC, Cupertino, CA (US)

(72) Inventors: Chubing Peng, Eden Prairie, MN (US); Tae-Woo Lee, Eden Prairie, MN (US); Peng Zhang, Bloomington, MN (US); Weibin Chen, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/901,991

(22) Filed: Feb. 22, 2018

Related U.S. Application Data

(60) Provisional application No. 62/462,651, filed on Feb. 23, 2017.

(51) Int. Cl.
*G11B 11/00* (2006.01)
*G11B 5/31* (2006.01)
*G11B 5/48* (2006.01)
*G11B 5/00* (2006.01)
*G11B 11/105* (2006.01)
*G11B 7/1387* (2012.01)

(52) U.S. Cl.
CPC .......... *G11B 5/314* (2013.01); *G11B 5/4866* (2013.01); *G11B 7/1387* (2013.01); *G11B 11/10534* (2013.01); *G11B 11/10536* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,974,043 B2 | 7/2011 | Shimazawa et al. | |
| 8,310,901 B1 | 11/2012 | Batra et al. | |
| 8,773,959 B2 | 7/2014 | Gao et al. | |
| 9,449,625 B1 * | 9/2016 | Vossough | G11B 5/3133 369/13.33 |
| 9,449,626 B2 | 9/2016 | Lee et al. | |
| 9,786,311 B2 * | 10/2017 | Chen | G11B 5/6082 369/13.33 |
| 9,799,352 B1 * | 10/2017 | Chen | G11B 5/3133 369/13.33 |
| 2014/0050058 A1 * | 2/2014 | Zou | G11B 11/10534 369/13.33 |
| 2014/0050486 A1 | 2/2014 | Bain et al. | |

(Continued)

*Primary Examiner* — Tan X Dinh
(74) *Attorney, Agent, or Firm* — Hollingsworth Davis, LLC

(57) ABSTRACT

A write head includes a waveguide, a magnetic pole, and a near-field transducer. The near-field transducer includes an enlarged portion and a peg. The peg is separated from the magnetic pole in a downtrack direction by a dielectric gap. A peg coupler covers a bottom surface of the magnetic pole and is separated from the peg. The peg coupler is formed of a first plasmonic material. A pad extends from the peg coupler into part of the gap in the downtrack direction towards the peg. The pad is formed of a second plasmonic material and extends into the write head away from the media-facing surface a distance L that is less than a corresponding distance of the peg coupler.

20 Claims, 15 Drawing Sheets

(56) References Cited

U.S. PATENT DOCUMENTS

| | | | | |
|---|---|---|---|---|
| 2016/0275972 A1* | 9/2016 | Zhao | ............... | G11B 5/314 |
| | | | | 369/13.33 |
| 2016/0275979 A1* | 9/2016 | Sahoo | ............... | G11B 5/314 |
| | | | | 369/13.33 |
| 2016/0351209 A1* | 12/2016 | Chen | ............... | G11B 5/314 |
| | | | | 369/13.33 |
| 2017/0249958 A1* | 8/2017 | Blaber | ............... | G11B 5/314 |
| | | | | 369/13.33 |
| 2018/0090159 A1* | 3/2018 | Zhao | ............... | G11B 5/3967 |
| | | | | 369/13.33 |

\* cited by examiner

HEAT-ASSISTED MAGNETIC RECORDING HEAD HAVING PEG COUPLER AND PLASMONIC PAD

RELATED PATENT DOCUMENTS

This application claims the benefit of U.S. Provisional Patent Application Ser. No. 62/462,651 filed on Feb. 23, 2017, to which priority is claimed pursuant to 35 U.S.C. § 119(e), and which is incorporated herein by reference in its entirety.

SUMMARY

The present disclosure is directed to a peg coupler and plasmonic pad used with a magnetic write pole and a near-field transducer. In one embodiment, a write head includes a waveguide, a magnetic pole, and a near-field transducer positioned at or near a media-facing surface. The near-field transducer includes an enlarged portion and a peg extending from the enlarged portion towards the media-facing surface. The peg is separated from the magnetic pole in a downtrack direction by a dielectric gap. A peg coupler covers a bottom surface of the magnetic pole near a tip of the magnetic pole and is separated from the peg. The peg coupler is formed of a first plasmonic material. A pad extends from the peg coupler into part of the gap in the downtrack direction towards the peg. The pad is formed of a second plasmonic material and extends into the write head away from the media-facing surface a distance L that is less than a corresponding distance of the peg coupler.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
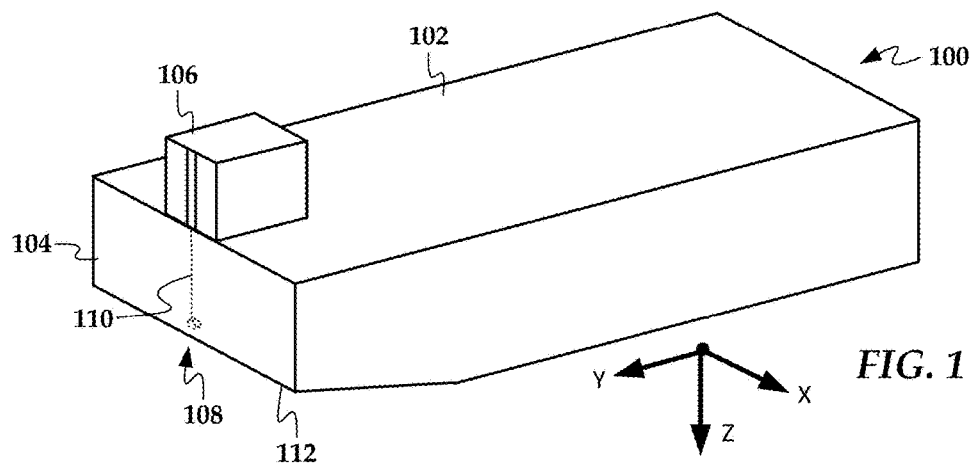
FIG. 1 is a perspective view of a slider assembly according to an example embodiment.

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

Light from a light source, such as an edge-emitting laser diode, is coupled into a HAMR waveguide through waveguide input coupler or a spot size converter. In current configurations, the laser diode is mounted on a magnetic slider in such a way that a transverse electric (TE) polarized light source excites a TE waveguide mode in the slider waveguide while a transverse magnetic (TM) polarized light source excites a TM waveguide mode. The NFT is designed to adapt the light delivery. For example, an NFT with a peg extending from an enlarged portion (e.g., stadium shaped enlarged portion) is designed for excitation by a first-higher order transverse electric waveguide mode, $TE_{10}$. A sharp-ended, elongated peg design is designed for excitation by a fundamental transverse magnetic waveguide mode, $TM_{00}$. Both of these designs may use a heat-sink coupled to an end of the NFT away from the end to draw heat away from the NFT.

To write a sharp magnetic transition, high thermal gradient (TG) is usually preferred. Generally, thermal gradient is the change in temperature per nanometer distance normal to the isothermal contour of the hotspot at the recording temperature, which is ~405° C. for FePt recording medium. Thermal gradient (TG) at the center of track along down track is defined as down-track TG, DT-TG, while that along cross-track direction defines cross-track TG, CT-TG. One way to enhance the thermal gradient is to recess the NFT heat-sink away from the recording medium. Recessing the heat sink reduces the background field from the large portion of the NFT and the NFT heat-sink. Another way to increase TG is to replace part of magnetic write pole that faces to the NFT peg with a plasmonic material of less light absorptive material relative to the pole material (e.g., FeCo). Generally a plasmonic material has negative permittivity in its real part. The imaginary part of the permittivity indicates light absorption. For example, a plasmonic metal Au, Rh, Ir, Pt, Ru can replace part of the magnetic pole tip. This layer of plasmonic metal is referred to as a peg coupler. Due to reliability concerns, Au is not preferred for the peg coupler material. With a more thermally robust plasmonic material (e.g., Ir, Rh, Pt) peg coupler, the improvement in thermal gradient is much reduced, only ~0.5 K/nm.

In embodiment described below, a plasmonic metal pad is added to a peg coupler. This combination forms an E-shaped cavity, hereafter referred to an E-resonator, when the NFT is loaded on the recording medium. The E-resonator amplifies the component of the electric field normal to the peg along the down-track direction, increasing the down-track TG and with only a small loss in cross-track TG. In some embodiments, the pad may be used without the peg coupler, e.g., extending directly from the write pole.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

Figure 2:
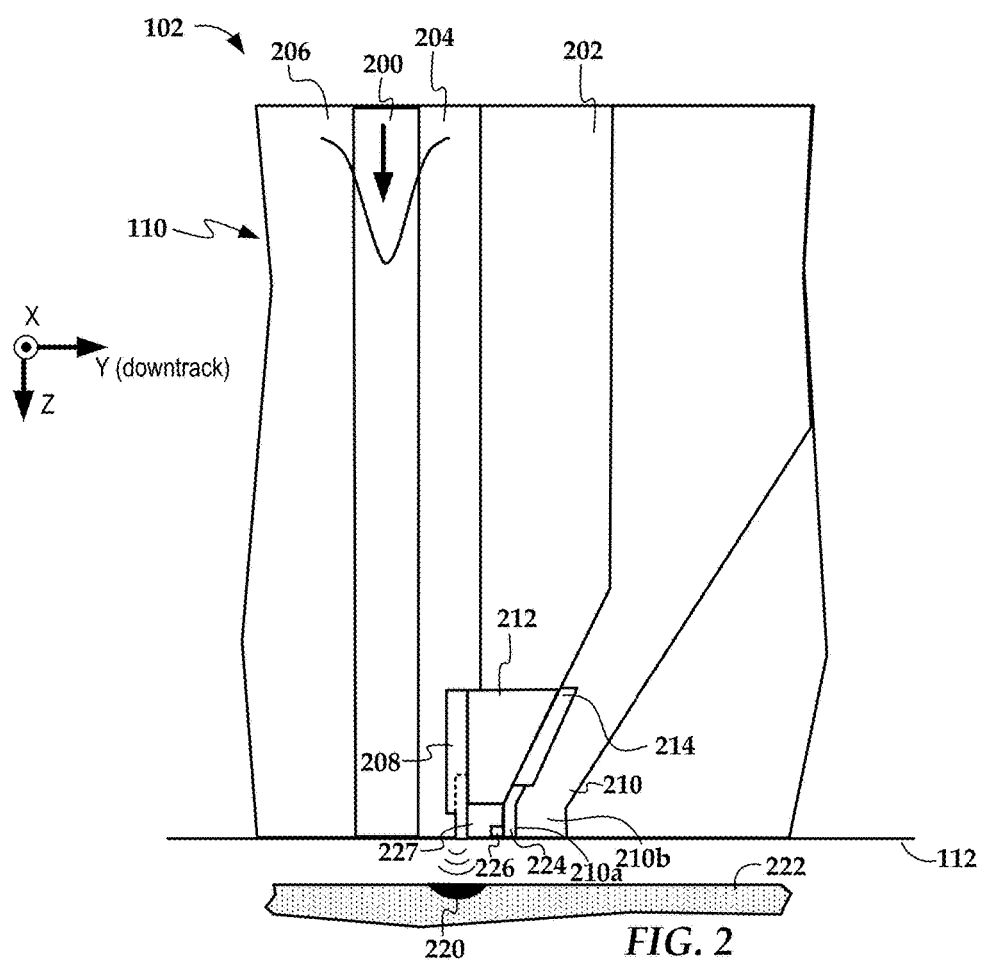
FIG. 2 is a cross-sectional view of a slider along a down-track plane according to according to an example embodiment.
Figure 3:
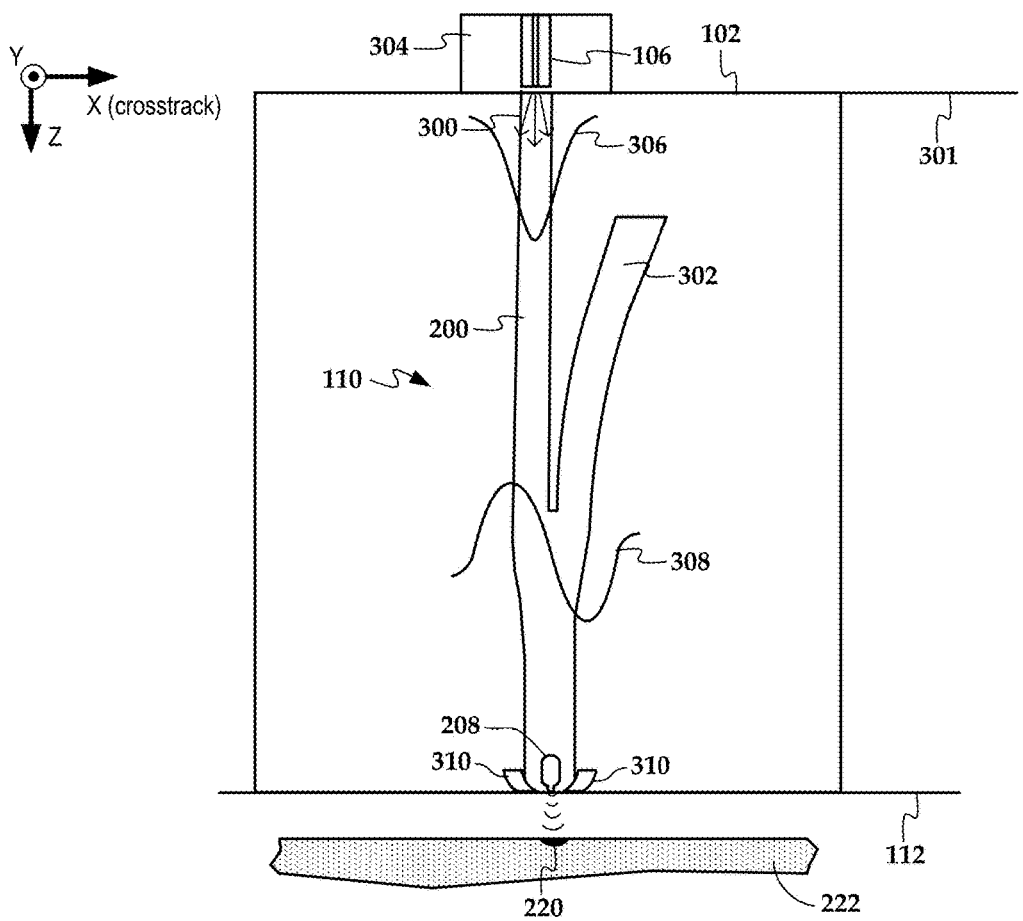
FIG. 3 is a wafer plane view of a slider according to an example embodiment.

In FIGS. 2 and 3, cross-sectional views show details of a slider body 102 according to an example embodiment. As best seen in FIG. 2, the waveguide 110 includes a core 200, top cladding layer 202, side cladding layer 204, and bottom cladding 206. As seen in FIG. 3, a waveguide input coupler 300 at a top surface 301 of the slider body 102 couples light from the light source 106 to the waveguide 110, the light source 106 being mounted to the slider body 102 via a submount 304. The waveguide input coupler 300 receives light from the light source 106 and transfers the light to the core 200. As it extends away from the light source 106, the core 200 tapers from narrower to wider width (width in this case is the core's x-dimension). The waveguide core 200 is made of dielectric materials of high index of refraction, for instance, AlN (aluminum nitride), $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon).

Figure 4:
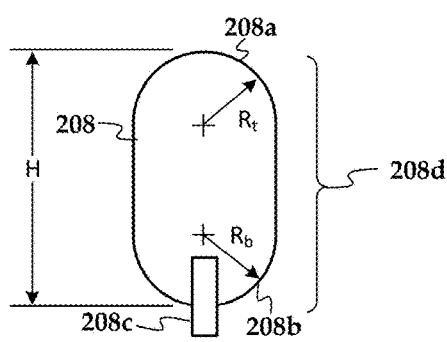
FIG. 4 is a close up view of the near-field transducer of FIG. 3.

A branch waveguide 302 splits off of the main core 200 and converts the fundamental transverse electric waveguide mode ($TE_{00}$), as indicated by mode profile 306, to a first-higher-order transverse electric mode ($TE_{10}$), as indicated by mode profile 308. The NFT 208 is designed for $TE_{10}$ coupling. Parabolic side shields 310 recycle some of optical energy that is not coupled into the NFT 208, transferring it into the longitudinal electric field, boosting the NFT efficiency and therefore, enhancing the thermal gradient. As seen in the detail view of FIG. 4, The NFT 208 has an enlarged portion 208d with two curved ends 208a-b and a peg 208c protruding from the enlarged portion 208d. In other configurations, one or both of the ends 208a-b may be flattened or pointed.

In reference again to FIG. 2, the NFT 208 is placed at the side and top cladding layers 204, 202 of the waveguide and near the waveguide core 200. The cladding layers 202, 204, 206 are each formed of a dielectric material having a refractive index lower than the core 200. The cladding can be, for instance, $Al_2O_3$ (aluminum oxide), SiO and $SiO_2$ (silica). The core 200 delivers light to an NFT 208 that is located within the side cladding layer 204 at the media-facing surface 112. A write pole 210 (also referred to herein as a "magnetic pole") is located near the NFT 208. A heat sink 212 thermally couples the NFT 208 to the write pole 210. A diffusion barrier 214 is shown between the heat sink 212 and the write pole. A magnetic coil (not shown) induces a magnetic field through the write pole 210 in response to an applied current. During recording, the NFT 208 forms a hotspot 220 within a recording layer of a moving recording medium 222. The write pole 210 sets a magnetic orientation in the hotspot 220, thereby writing data to the recording medium.

The HAMR writer configuration shown in FIGS. 2 and 3 uses a first-higher transverse electric mode ($TE_{10}$) light delivery. Light, emitting from a laser diode, is coupled into a three-dimensional single mode ($TE_{00}$) channel waveguide by a waveguide input coupler. The excited fundamental mode, $TE_{00}$, is converted into the first higher order mode, $TE_{10}$, with the assisted branch waveguide 302. The NFT 208 interacts with the incident light at the $TE_{10}$ waveguide mode, generating local surface plasmon along the circumference of the NFT 208. The charges are funneled into the peg 208c, resulting in lightning effect. For efficient NFT excitation, the $TE_{10}$ waveguide cross-section dimension and shape of the NFT, including the end curvature/shape and NFT height as well as peg dimension need optimized. The embodiment described herein may be used with light delivery systems using other forms of $TE_{00}$-to-$TE_{10}$ mode order converter, such as directional couplers, multi-mode interference (MMI) devices, and waveguide bends.

As seen in FIG. 2, a peg coupler 224 extends from the write pole 210 towards the peg of the NFT 208. The peg coupler 224 covers at least a bottom surface 210a of the write pole 210 near a tip 210b of the write pole 210. The bottom surface 210a faces the NFT 208. The peg coupler 224 is formed of a robust plasmonic material (e.g., Ir, Rh, Pt). A plasmonic metal pad 226 is located between the NFT peg and the peg coupler 224, extending into a gap 227 between the NFT peg and the write pole 210. The plasmonic pad 226 can be made from the same plasmonic material or different plasmonic material than the peg coupler 224. Generally, the plasmonic pad 224 extends away from the media-facing surface 112 (the negative z-direction in this view) a shorter distance than the peg coupler 224, the latter covering a tip of the write pole 210 in the crosstrack direction. Together, the plasmonic metal pad 226 and peg coupler 224 form an E-resonator to improve thermal gradient of the hotspot 220. In some embodiments, the metal pad 226 may be used without the peg coupler 224. In such a case, the metal pad 226 extends away from the media-facing surface 112 a shorter distance than the NFT 208.

Figure 5:
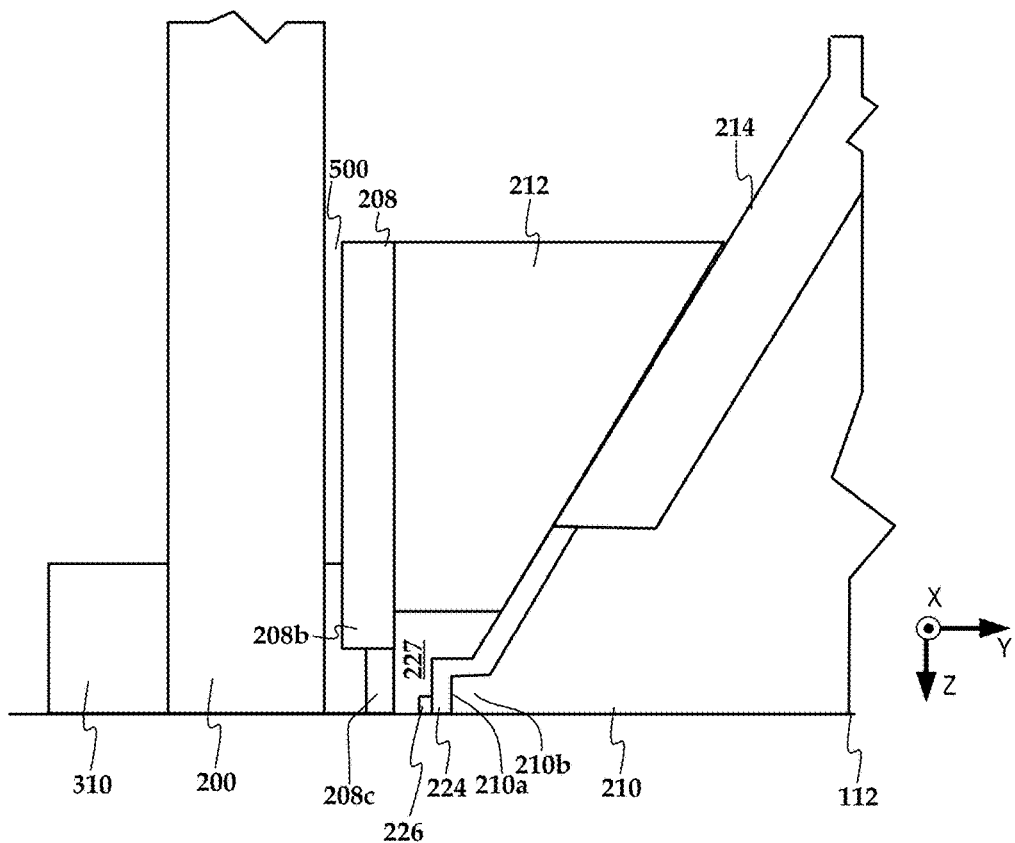
FIG. 5 is a close-up of the cross-sectional view of FIG. 2.

In FIG. 5, a close-up view shows additional details of the plasmonic metal pad 226 and peg coupler 224. A spacer 500 can be seen between the NFT 208 and the core 200. The plasmonic metal pad 226 and peg coupler 224 partially fill the gap 227 between the write pole 210 and the peg 208c. If the heat sink 212 is recessed away from the NFT 208, this gap 227 also separates a lower edge of the heat sink 212 that faces the media-facing surface 112 and an upper edge of the peg coupler 224 facing away from the media-facing surface 112. The pad could be arc-shaped in the XY plane to reduce the curvature of recording magnetic transitions for higher density.

To write a sharp magnetic transition, high write field from the magnetic pole 210 is combined with a high thermal gradient, generated from the NFT 208. The magnetic field from the magnetic pole 210 decays away from the pole tip at a rate of about 10% per 10 nm while the electromagnetic field from the NFT 208 is concentrated at the peg 208c. So it is desired to bring the pole tip 210 close to the NFT peg 208c. However, the magnetic pole 210, usually made of Co—Fe alloys for high magnetic moment, is a lossy metal at the optical frequencies, absorbing the optical field. When the pole tip 210 is close to the NFT peg 208c, the NFT resonance is damped substantially, decreasing the NFT efficiency and the thermal gradient.

To mitigate the negative impact from the magnetic pole 210, the peg coupler 224, made of a plasmonic material, such as Au, Ag, Cu, Rh, Ir, Pt, etc, is deposited underneath the magnetic pole 210. Ag is the best plasmonic material at visible frequencies, but it is easily oxidized. Au is the next best plasmonic material and is also chemically stable, but it will recess during operation, due to its poor adhesion to the surrounding dielectric oxides and low melting temperature. Cu cannot be used either, due to its surface oxidation and corrosion near ABS. For reliability, Rh, Ir, and Pt are the three left to be chosen from. Even so, Rh and Ir are still much less absorptive than the magnetic pole 210, so the NFT efficiency is less reduced.

Pushing the field above the peg 208c and toward the magnetic pole 210 improves the thermal gradient. One key parameter is $E_y$, the y-component of the electric field. The $E_y$ component is very strong near the bottom surface of the NFT 208 and confined at the NFT-core spacer 500. The NFT-core spacer 500 is dielectric, functioning as a cladding for the waveguide core 200 and having lower index of refraction than the core 200. For both $TM_{00}$ and $TE_{10}$ light deliveries, there is a strong $E_y$ component at the bottom surface (facing to the core 200) of the NFT peg.

Figure 7:
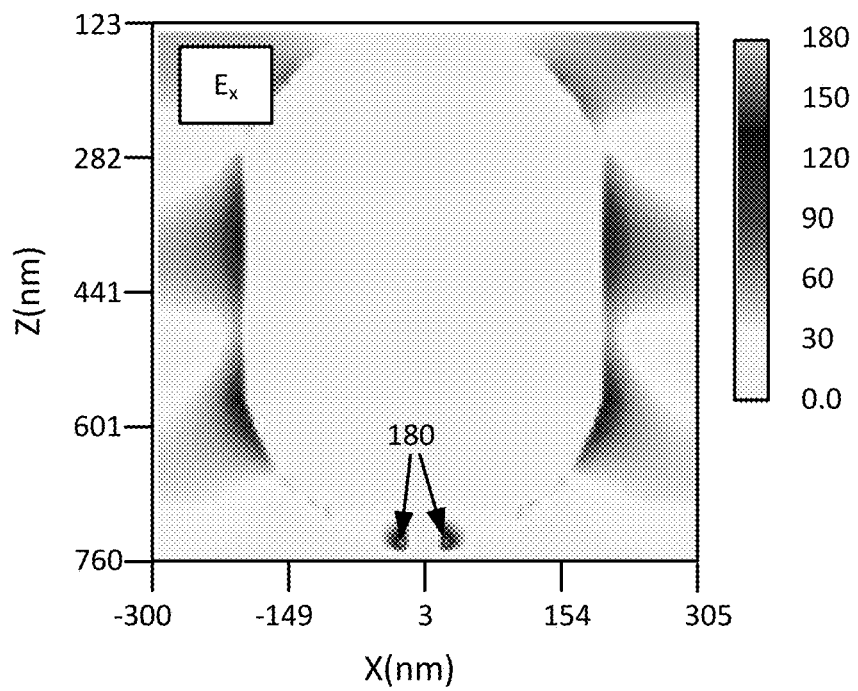
FIGS. 7 and 8 are field contour plots of a near-field transducer according to an example embodiment.
Figure 8:
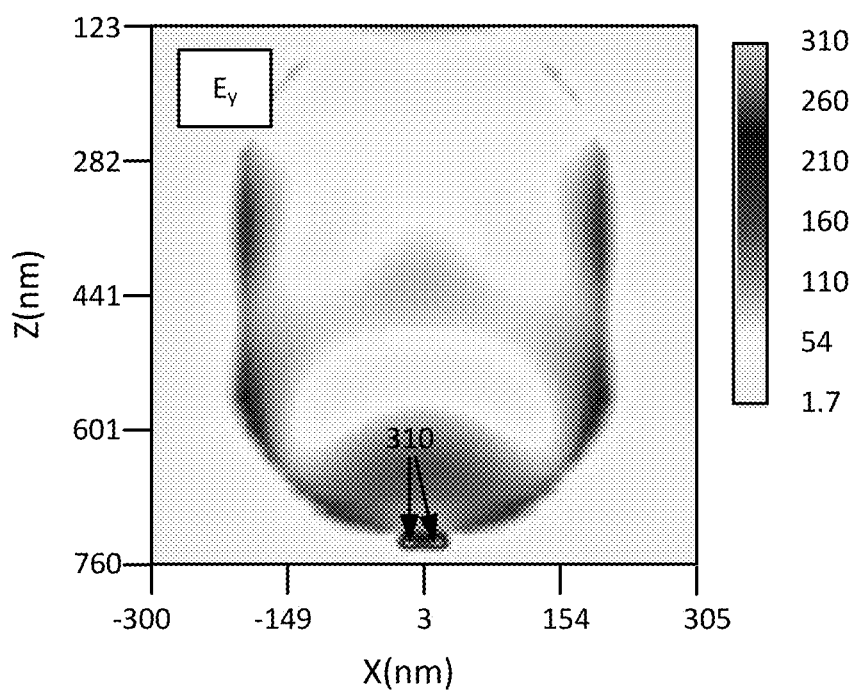

If the light delivery uses a fundamental transverse magnetic mode, $TM_{00}$, the surface plasmon is excited at the bottom surface of the NFT, the field being $E_y$ dominated. For the illustrated light delivery using a first-higher order transverse electric mode, $TE_{10}$, the surface plasmon is excited along circumference of the NFT 208 near the NFT-core spacer 500 The dominated field is transverse to the circumference of the NFT 208, namely the $E_x$ and $E_z$ components. A strong $E_y$ component is also formed at the NFT bottom surface 208b near the peg 208c, due to the field rotation induced by the NFT, as shown in the contour plots of FIGS. 7 and 8. These plots illustrate profiles of the amplitude of x- (Ex) and y- (Ey) component of the electric field on a XZ plane in-between the NFT and core. The light delivery is $TE_{10}$ mode. The NFT, heat-sink, and peg all use gold.

Figure 6A:
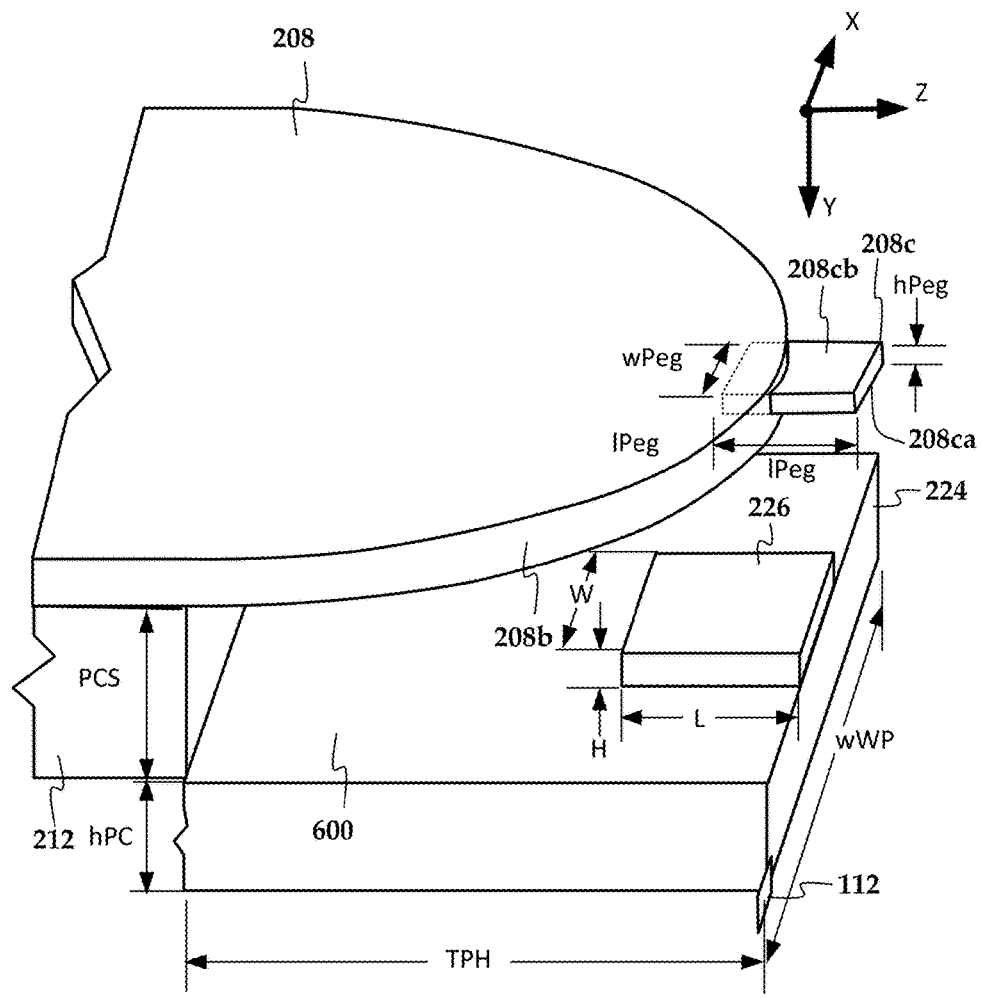
FIG. 6A is a perspective view of a peg coupler and pad according to an example embodiment.
Figure 6B:
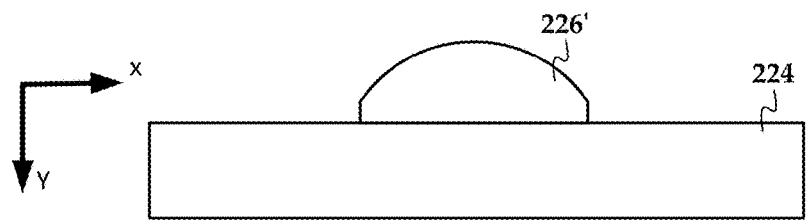
FIG. 6B is a plan view of a peg coupler and peg according to another example embodiment.

In FIG. 6A, a perspective view shows parameters defining peg coupler 224 and a plasmonic pad 226. The NFT heat-sink 212 is recessed from the media-facing surface 112 by TPH along the Z- axis. The peg coupler 224 is on the magnetic pole (not shown in this view), hPC thick along the down-track (Y) direction, and wWP wide along the cross-track (X) direction. The plasmonic pad 226 is on the peg coupler 224, L long along the Z-direction, H thick along the Y-direction, and W wide along the X-direction. The magnetic pole, peg coupler 224, and the pad 226 are centrally aligned with the NFT peg 208c in the cross-track direction. A dielectric spacer 600 fills the space between the coupler 224, pad 226, and the NFT 208. As seen by alternate geometry pad 226' in FIG. 6B, the pad could be arc-shaped in the XY plane (with the arc-shaped surface facing the NFT) to reduce the curvature of recorded magnetic transitions for higher density.

To obtain a high down-track thermal gradient (DT-TG), it is preferred to have the $E_y$ component more or less equal magnitude at the top and bottom surface of the peg 208c, which corresponds to opposing downtrack surfaces of the peg 208c. In this convention, the top surface 208ca of the peg 208c faces the peg coupler 224 and the bottom surface 208cb faces away from the peg coupler 224 (e.g., towards the waveguide core). Note that the $E_y$ component in the dielectric spacer 600 between the NFT 208 and the peg coupler 224 is tangential to the NFT heat-sink 212. The electric current generated at the surface of NFT heat-sink 212 makes the $E_y$ component nearly zero at the interface between the NFT heat-sink 212 and the dielectric spacer 600. So to achieve large $E_y$ magnitude at the top surface of the peg 208c, the NFT heat-sink is recessed from the media-facing surface 112, for instance, TPH>lPeg as shown in FIG. 6A.

Figure 9:
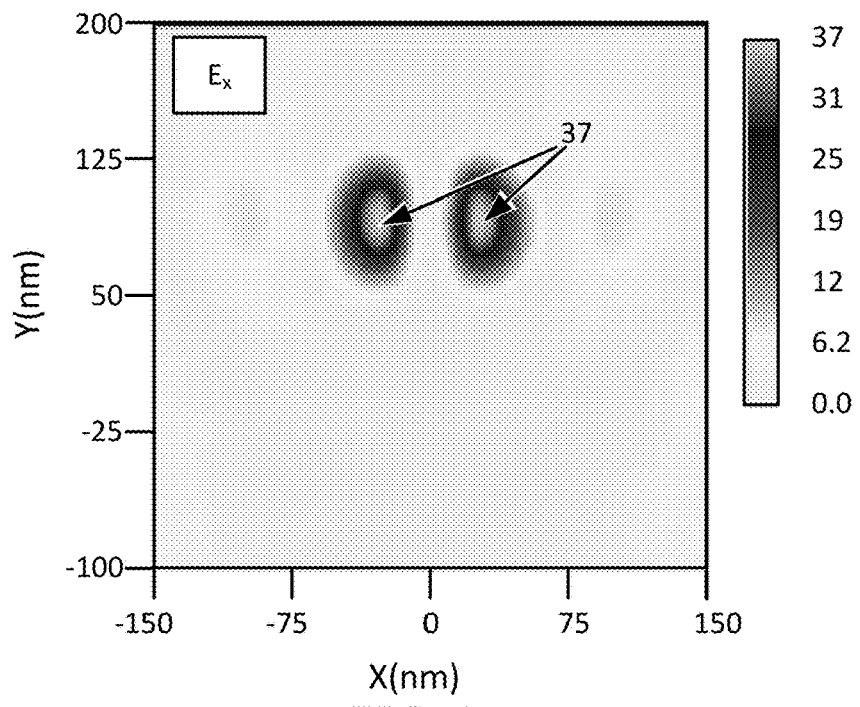
FIGS. 9, 10, and 11 are field contour plots of a recording medium hotspot according to an example embodiment.
Figure 10:
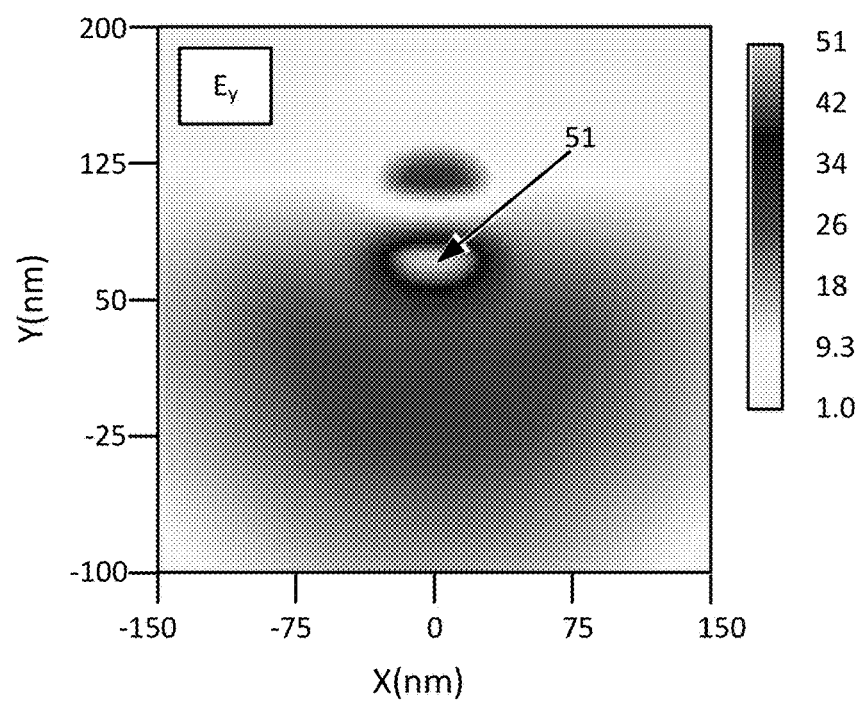
Figure 11:
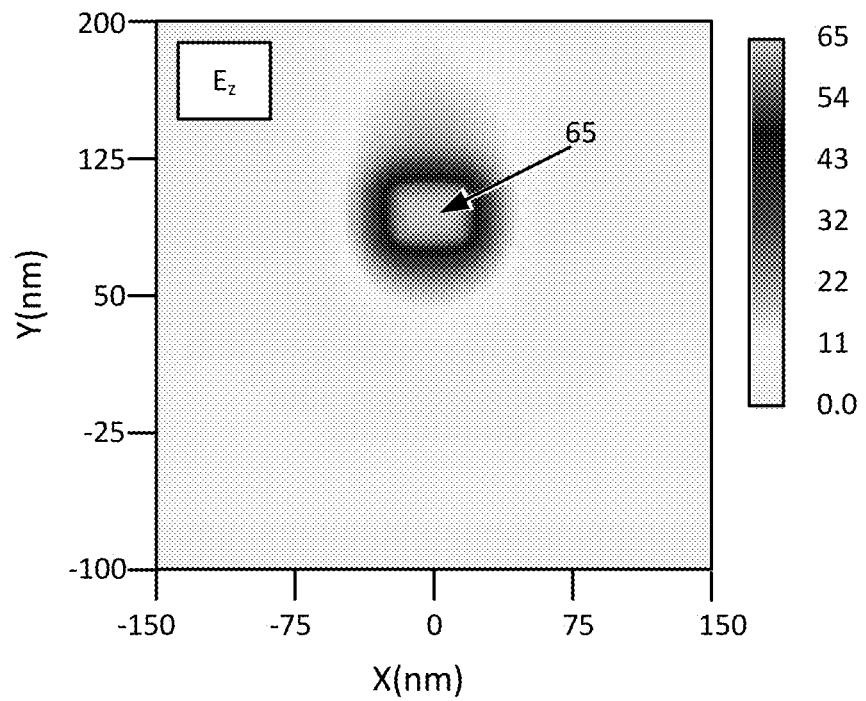

In FIGS. 9-11, contour plots show the profiles of three field components in a recording layer at TPH=lPeg. The light delivery is $TE_{10}$ mode and the peg is Au. There is no peg coupler and the dielectric spacer 600 between NFT and pole at the peg is 20-nm. Note that in FIG. 10, the longitudinal electric field component, Ey, is centered underneath the peg. The asymmetry in $E_y$ along the down-track (Y) direction is clearly seen. The recess of the heat-sink 212 (TPH>lPeg) can also come with drawbacks: the rise of the temperature at the peg and the decrease in the NFT efficiency. There will be an optimal TPH for thermal gradient. A MIM (M—metal, I—insulator) plasmonic split ring resonator that includes the peg coupler, the dielectric spacer, and the NFT, is formed to further push the $E_y$ component into the dielectric spacer. Modeling showed that the peg coupler 224, made of 20-nm thick Ir, improves TG by ~0.5 K/nm.

Figure 12:
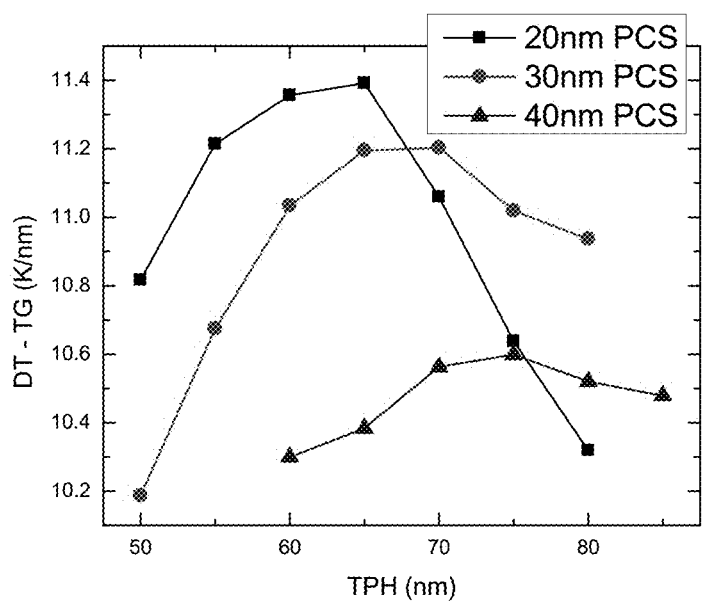
FIGS. 12, 13, and 14 are graphs showing the calculated thermal gradient along the down-track (DT-TG) and cross-track (CT-TG) direction as well as the required laser power (LDI) for a slider as a function of recess TPH according to example embodiments.
Figure 13:
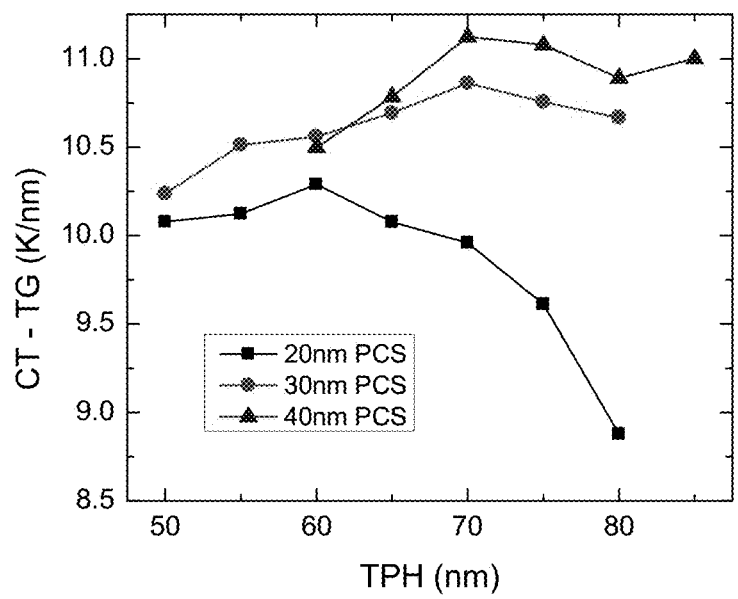
Figure 14:
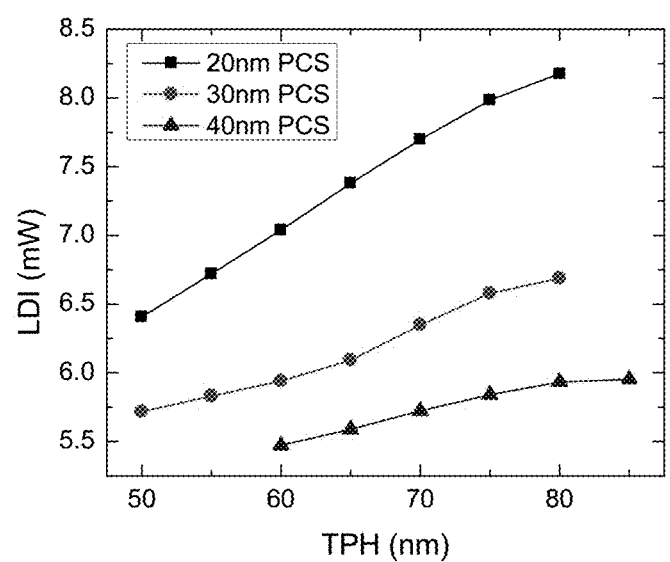

In FIGS. 12-14 are graphs showing the calculated thermal gradient (TG) and the required laser power (LDI) as a function of recess (TPH) at three NFT-peg coupler spacing (PCS). There is no plasmonic pad attached on the peg coupler. In the figures, DT-TG denotes the thermal gradient along the down-track direction and CT-TG along the cross-track direction. In this modeling, the peg coupler is hPC=20 nm thick and wWP=190 nm wide; the peg is lPeg=20 nm long, wPeg=42 nm wide, and hPeg=25 nm thick. The quoted thermal gradient is at a track width of 64 nm and assuming 405° C. as the writing temperature. As expected, recessing the heat-sink increases the thermal gradient; it also increases the laser output power needed for writing, indicating the reduction in the NFT efficiency. There is also a trade-off between down-track and cross-track thermal gradient. With decreasing NFT-peg coupler spacing (PCS), DT-TG increases but CT-TG decreases rapidly. PCS=30 nm seems to be the best compromise between DT- and CT-TG. At this spacing, DT-TG=11.2 K/nm, and CT-TG=10.8 K/nm. From PCS=30 to 20 nm, CT-TG decreases significantly with only a slight increase in DT-TG.

Figure 15:
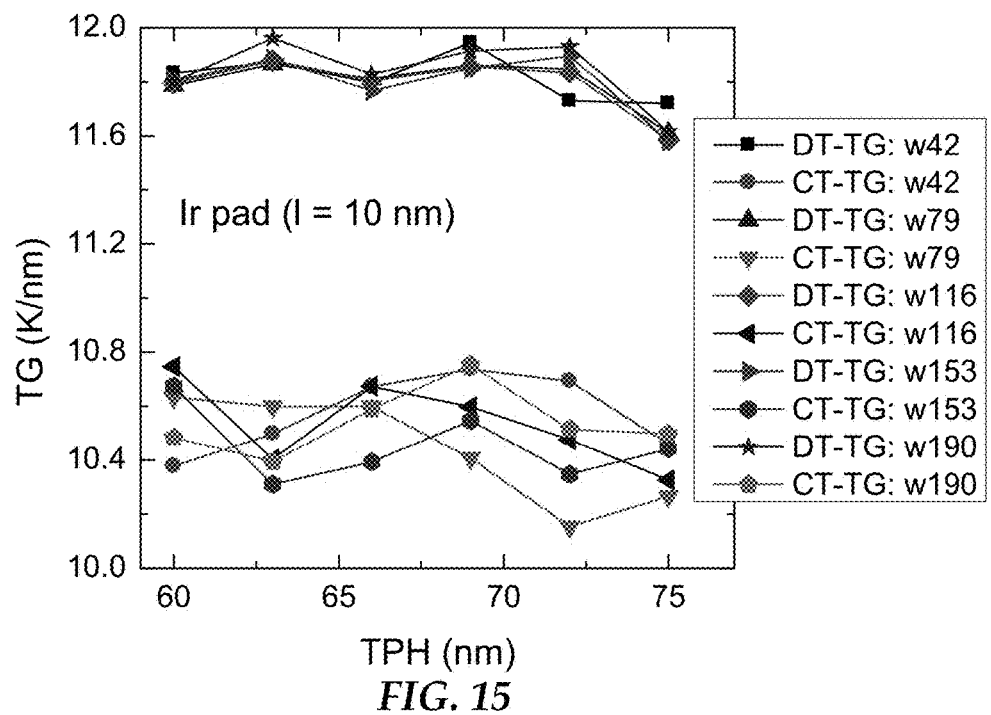
FIGS. 15 and 16 are graphs showing a comparison between a Ir plasmonic pad and a $Al_2O_3$ dielectric pad (or no pad) in the calculated thermal gradient according to example embodiments.
Figure 16:
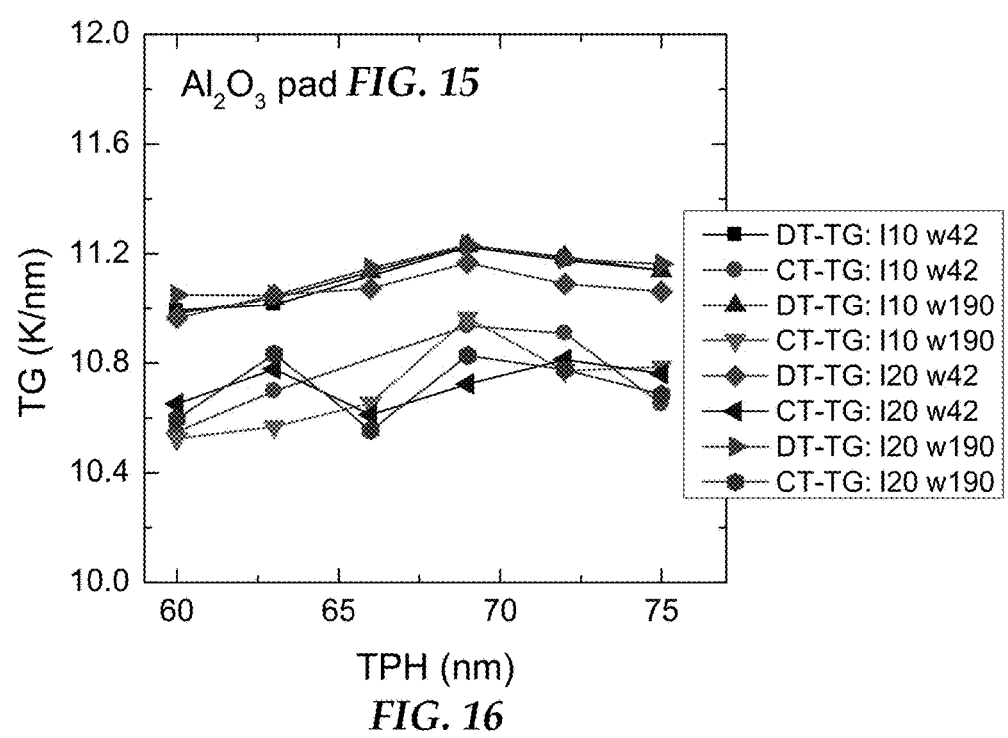
Figure 17:
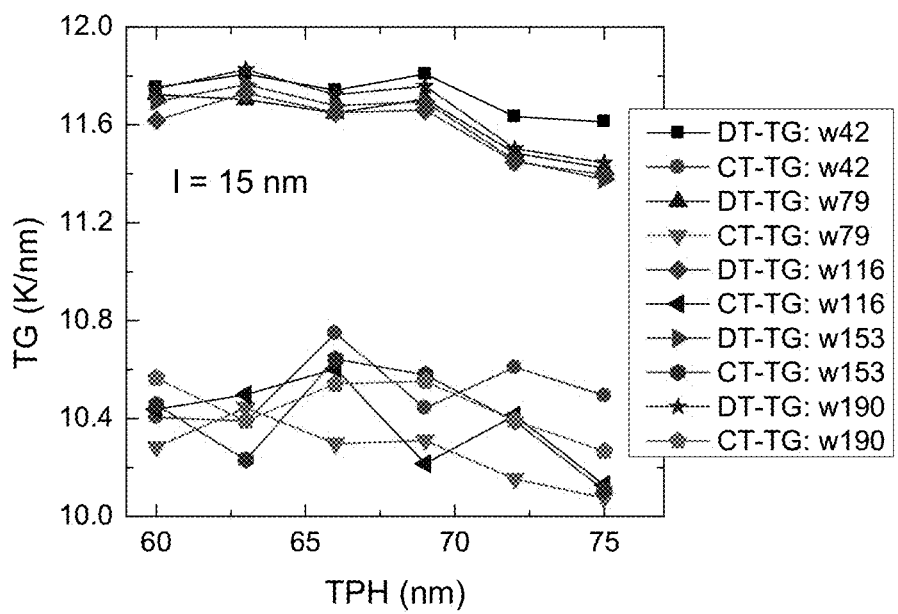
FIGS. 17, 18, 19, and 20 are graphs showing dependence of thermal gradient on pad length and pad width according to example embodiments.
Figure 18:
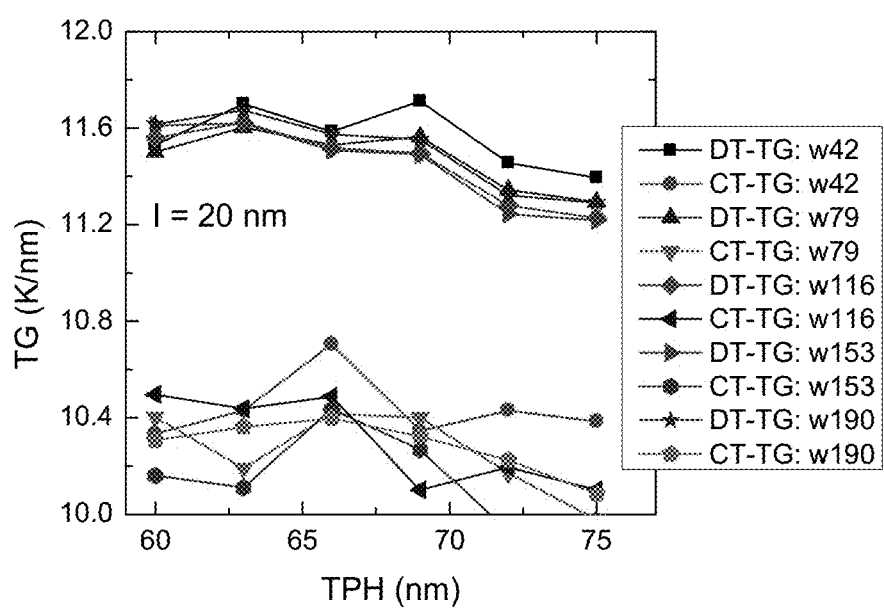
Figure 19:
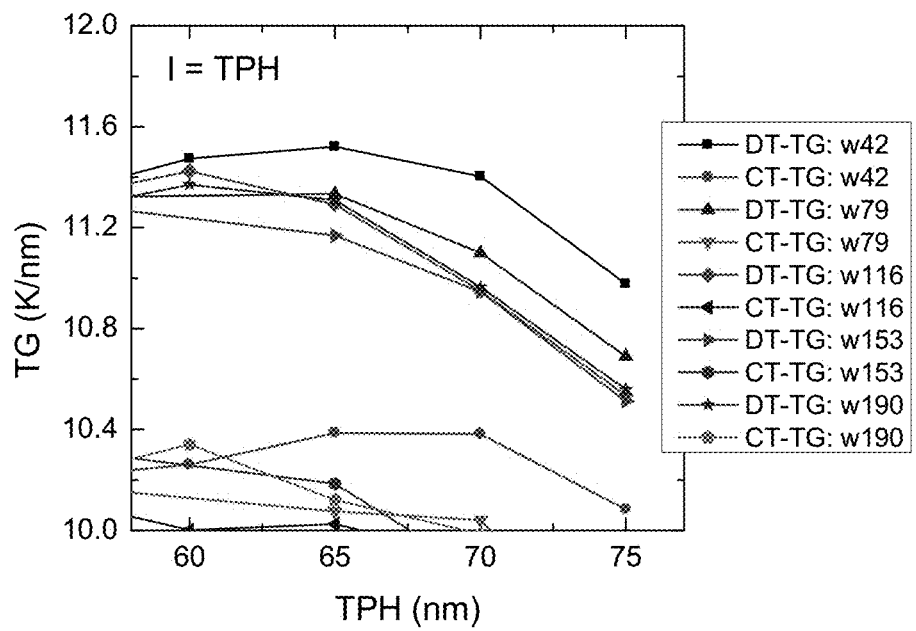
Figure 20:
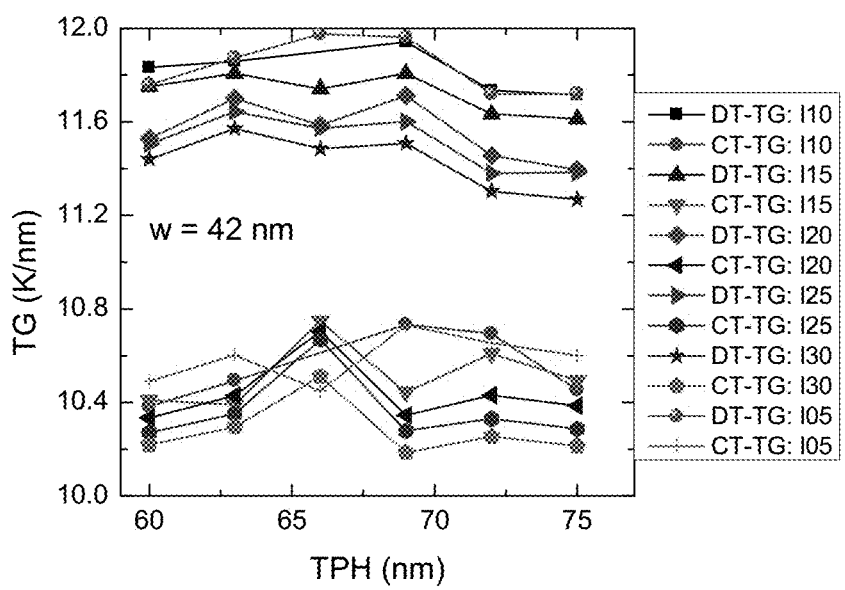

In FIGS. 15 and 16, graphs show the calculated TG versus TPH with an Ir plasmonic pad attached on the Ir peg coupler. The analysis was performed for various pad widths (W) and lengths (L). To verify the modeling, the Ir plasmonic pad is replaced with a dielectric $Al_2O_3$ pad, the same material used as the dielectric spacer between the NFT and the peg coupler. The plasmonic pad is H=10 nm thick along the Y-direction and L=10 nm long from the media-facing surface. PCS=30 nm.

It can be seen that this plasmonic pad improves the DT-TG by 0.7-0.8 K/nm, closer to 12 K/nm, with only a small loss, ~0.1 K/nm, in CT-TG. There is ~5% increase in LDI, comparing to a configuration without the plasmonic pad. It is also interesting to see that the DT-TG does not significantly vary with the pad width W. The CT-TG is slightly dependent on the pad width and is optimal at the two extremities modeled: W=42 nm, the same as the peg width (wPeg), and 190 nm, same as the peg coupler width. Using a wide pad eases the fabrication process. The graphs in FIGS. 17-20 show the dependence of thermal gradient on Ir pad length. With a longer pad, both down-track and cross-track TG decrease.

In summary, using a plasmonic pad together with a peg coupler improves the down-track thermal gradient by 0.7-0.8 K/nm and with only slight loss, ~0.1 K/nm. This idea could apply any peg-type NFT design, such as the enlarged portion with peg design and a $TM_{00}$ mode light delivery. This could also be used with a peg-only design with a radially polarized light delivery.

Figures 21, 22:
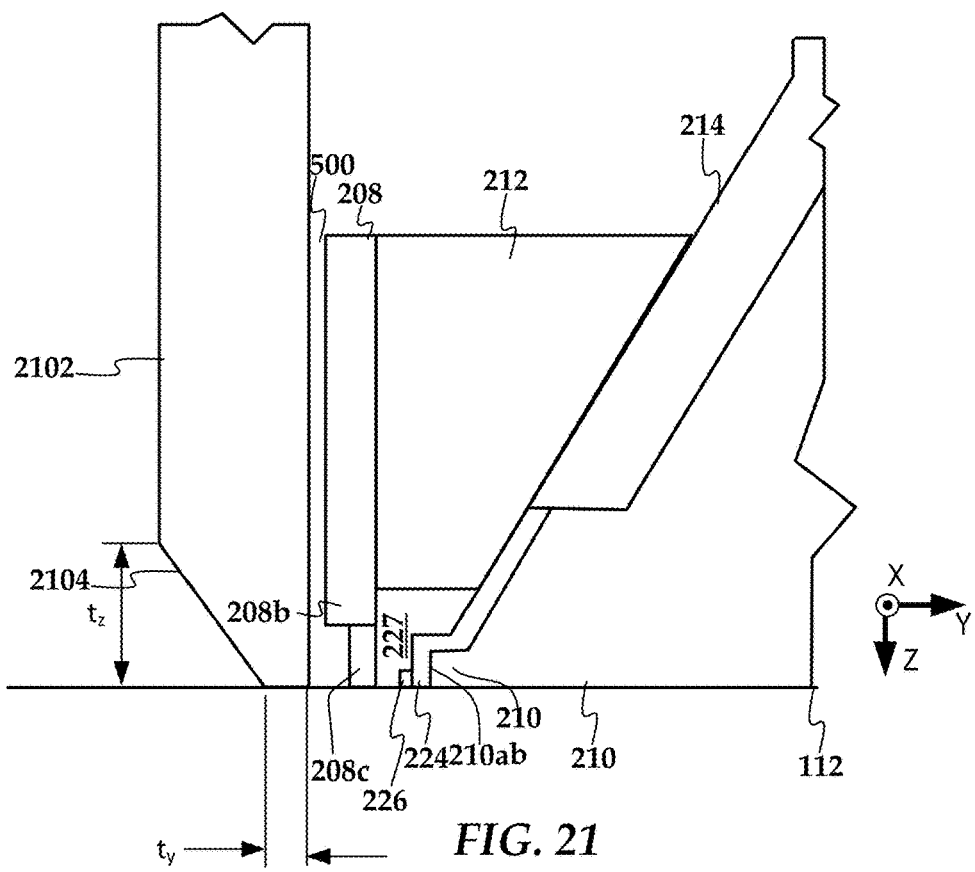
FIG. 21 is a cross-sectional view of a slider along a down-track plane according to according to another example embodiment.
FIG. 22 is a graph showing calculated thermal gradients for the slider configuration shown in FIG. 21.

In FIG. 21, a cross-sectional view shows a read/write head according to another example embodiment, using the same reference numbers for same or similar components as shown in FIGS. 2 and 5 and described above. In this embodiment, a waveguide core 2102 has a taper 2104 facing away from the NFT 208 and write pole 210. Other aspects of this embodiment, including materials and dimensions, may be similar to other embodiments described above.

The taper 2104 is at an oblique angle θ to the media-facing surface 112. The taper 2104 reduces NFT-induced TM component coupling. The dimension $t_z$ of the taper may be in the range of 150-200 nm. The resulting downtrack thickness $t_y$ of the core 2102 may be in the range of 30-50 nm. As seen in the graph of FIG. 22, the tapered core 2102 can increase downtrack and crosstrack thermal gradient by 0.2 K/nm and 0.3 K/nm, respectively. For the results shown in FIG. 22, the following dimensions were used: PCS=30 nm; pad L=H=10 nm; and pad W=190 nm (same as pole width).

Figure 23:
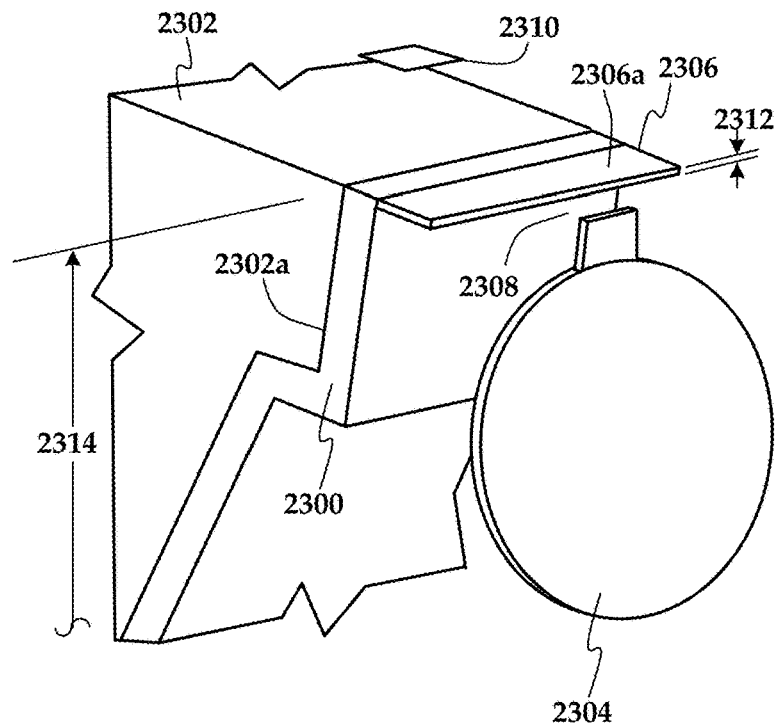
FIGS. 23-26 are perspective views showing a peg coupler and pad according to example embodiments.

In FIG. 23, a perspective view shows a peg coupler 2300 according to another example embodiment. The peg coupler 2300 extends from a write pole 2302 towards a peg of an NFT 2304. The peg coupler 2300 covers at least a bottom surface 2302a of the write pole 2302 near a tip of the write pole 2302. The bottom surface 2302a faces the NFT 2304. The peg coupler 2300 may be formed of a robust plasmonic material. A plasmonic metal pad 2306 is located between the NFT peg and the peg coupler 2300, extending into a gap 2308 between the NFT peg and the write pole 210.

In this example, the plasmonic pad 2306 is a rectangular plate with a major surface 2306a (e.g., surface with a surface area greater than other surfaces of the pad that are not parallel to the major surface) at or near a media-facing surface 2310. The plasmonic pad 2306 can be made from the same plasmonic material or different plasmonic material than the peg coupler 2300. The plasmonic pad 2306 extends away from the media-facing surface 2310 a shorter distance 2312 than a corresponding distance 2314 of peg coupler 2300. Both the plasmonic pad 2306 and peg coupler 2300 are as wide as the tip of the write pole 2302 in the crosstrack direction.

Figure 24:
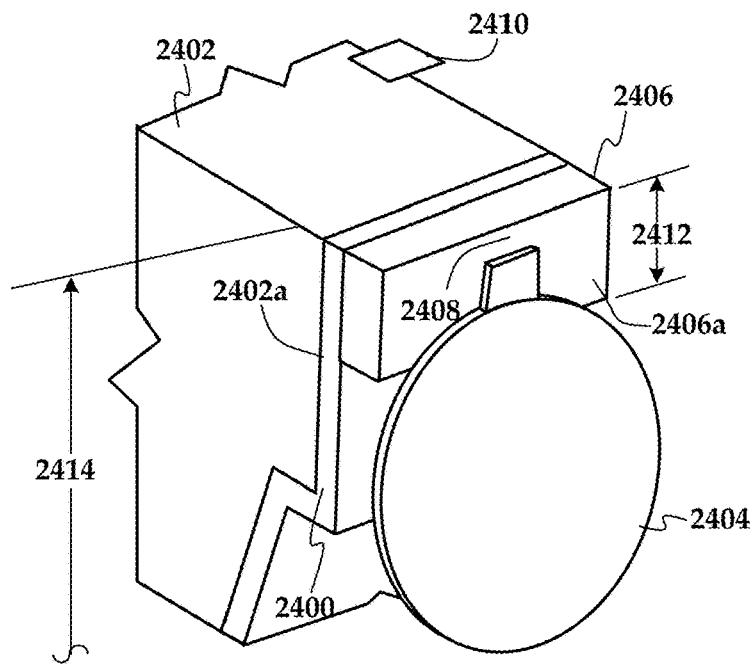

In FIG. 24, a perspective view shows a peg coupler 2400 according to another example embodiment. The peg coupler 2400 extends from a write pole 2402 towards a peg of an NFT 2404. The peg coupler 2400 covers at least a bottom surface 2402a of the write pole 2402 near a tip of the write pole 2402. The bottom surface 2402a faces the NFT 2404. The peg coupler 2400 may be formed of a robust plasmonic material. A plasmonic metal pad 2406 is located between the NFT peg and the peg coupler 2200, extending into a gap 2408 between the NFT peg and the write pole 210.

In this example, the plasmonic pad 2406 is a rectangular block having major surfaces 2406a parallel with bottom surface 2402a of the write pole 2402. The plasmonic pad 2406 can be made from the same plasmonic material or different plasmonic material than the peg coupler 2400. The plasmonic pad 2406 extends away from the media-facing surface 2410 a shorter distance 2412 than a corresponding distance 2414 of peg coupler 2400. Both the plasmonic pad 2406 and peg coupler 2400 are as wide as the tip of the write pole 2402 in the crosstrack direction.

Figure 25:
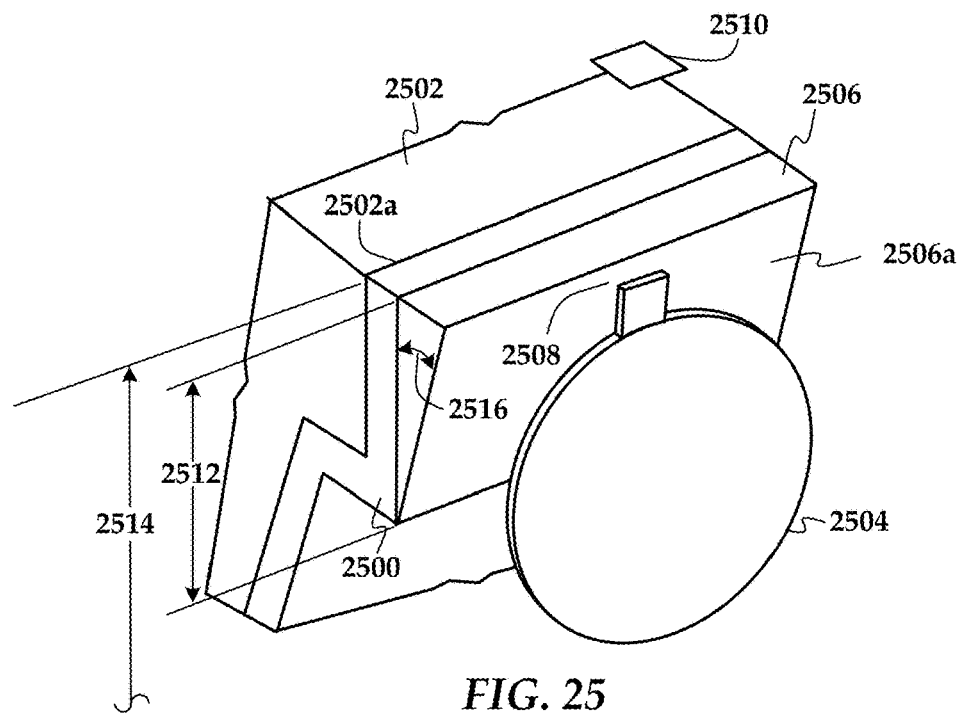

In FIG. 25, a perspective view shows a peg coupler 2500 according to another example embodiment. The peg coupler 2500 extends from a write pole 2502 towards a peg of an NFT 2504. The peg coupler 2500 covers at least a bottom surface 2502a of the write pole 2502 near a tip of the write pole 2502. The bottom surface 2502a faces the NFT 2504. The peg coupler 2500 may be formed of a robust plasmonic material. A plasmonic metal pad 2506 is located between the NFT peg and the peg coupler 2200, extending into a gap 2508 between the NFT peg and the write pole 210.

In this example, the plasmonic pad 2506 has a sloped surface 2506a facing the NFT 2504. The sloped surface 2506a is at an oblique angle 2516 relative to bottom surface 2502a of the write pole 25012. The plasmonic pad 2506 can be made from the same plasmonic material or different plasmonic material than the peg coupler 2500. The plasmonic pad 2506 extends away from the media-facing surface 2510 a shorter distance 2512 than a corresponding distance 2514 of peg coupler 2500. Both the plasmonic pad 2506 and peg coupler 2500 are as wide as the tip of the write pole 2502 in the crosstrack direction.

Figure 26:
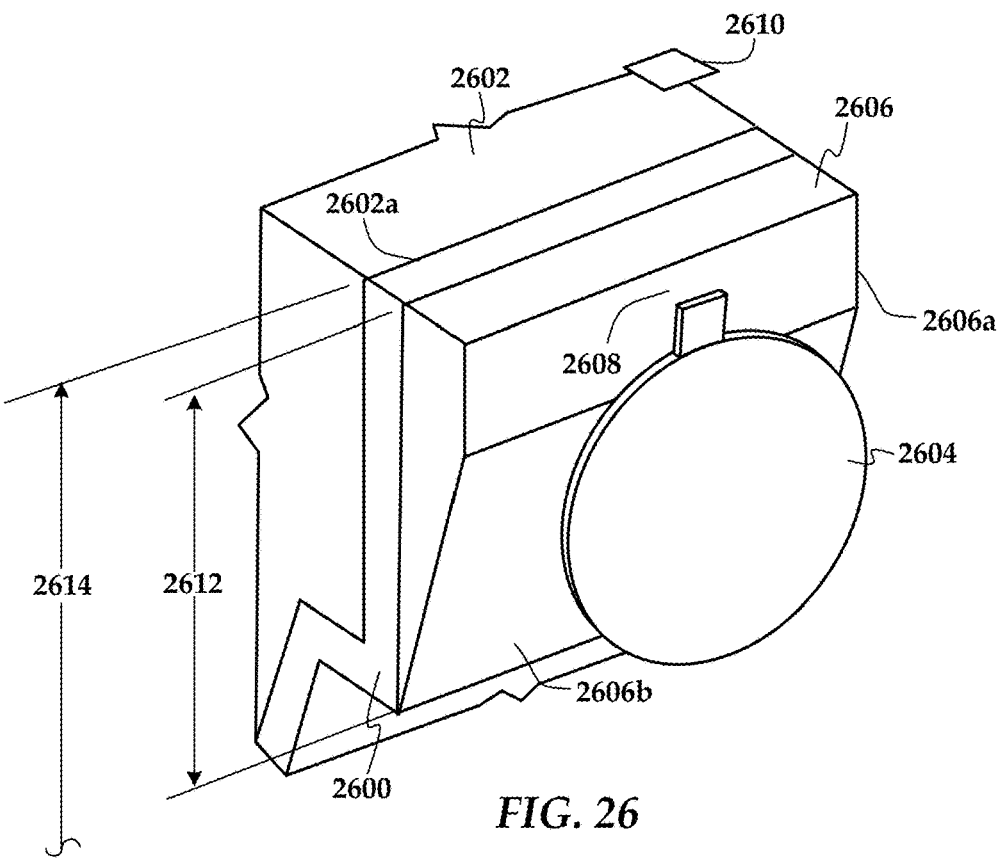

In FIG. 26, a perspective view shows a peg coupler 2600 according to another example embodiment. The peg coupler 2600 extends from a write pole 2602 towards a peg of an NFT 2604. The peg coupler 2600 covers at least a bottom surface 2602a of the write pole 2602 near a tip of the write pole 2602. The bottom surface 2602a faces the NFT 2604. The peg coupler 2600 may be formed of a robust plasmonic material. A plasmonic metal pad 2606 is located between the NFT peg and the peg coupler 2200, extending into a gap 2608 between the NFT peg and the write pole 210.

In this example, the plasmonic pad 2606 has a sloped surface 2606b and a second, substrate-parallel surface 2606a joined with the sloped surfaced 2606b, both surfaces 2606a-b facing the NFT 2604. The sloped surface 2606b is at an oblique angle 2616 relative to bottom surface 2602a of the write pole 2602. The substrate-parallel surface 2606a is near the media-facing surface 2610 and parallel to the bottom surface 2602a of the write pole 2602. The plasmonic pad 2606 can be made from the same plasmonic material or different plasmonic material than the peg coupler 2600. The plasmonic pad 2606 extends away from the media-facing surface 2610 a shorter distance 2612 than a corresponding distance 2614 of peg coupler 2600. Both the plasmonic pad 2606 and peg coupler 2600 are as wide as the tip of the write pole 2602 in the crosstrack direction.

While not shown in FIGS. 23-26, these embodiments may further include a heat sink extending from the enlarged portion of the NFT to the magnetic pole. The peg coupler, the pad, the heat sink, and the near-field transducer in such a configuration form an E-shaped cavity resonator that increases a thermal gradient of a hotspot created on a recording medium via the near-field transducer. The heat sink in such configurations may be recessed from the media-facing surface as described elsewhere herein, e.g., recessed by a distance TPH to equalize a magnitude of a downtrack electric field component on opposing downtrack surfaces of the peg.

Figure 27:
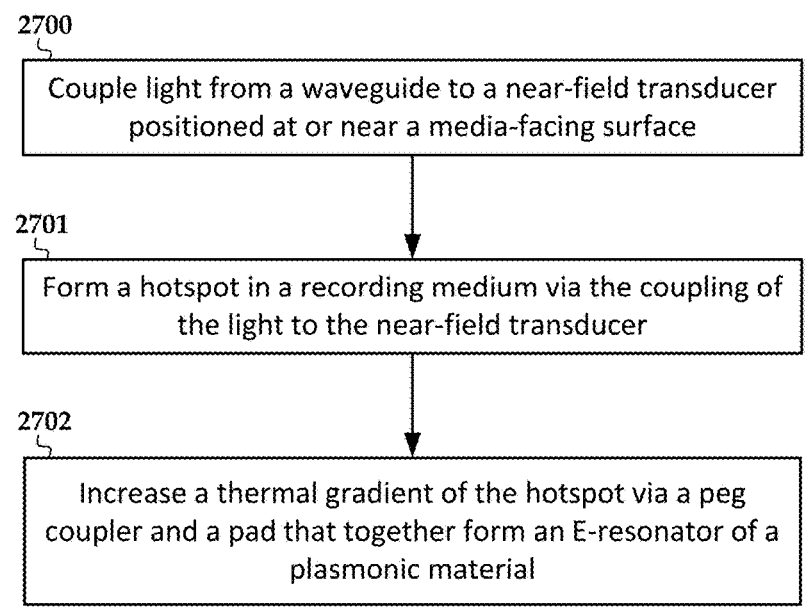
FIG. 27 is a flowchart of a method according to an example embodiment.

In FIG. 27, a flowchart shows a method according to an example embodiment. The method involves coupling 2700 light from a waveguide to a near-field transducer positioned at or near a media-facing surface. The near-field transducer includes a peg extending towards the media-facing surface. The peg is separated from a magnetic pole in a downtrack direction by a dielectric gap. A hotspot is formed 2701 in a recording medium via the coupling of the light to the near-field transducer. A thermal gradient of the hotspot is increased 2702 via a peg coupler and a pad that together form an E-shaped cavity of plasmonic material. The peg coupler covers a bottom of the magnetic pole near a tip of the magnetic pole and is separated from the peg. The pad extends from the peg coupler into part of the gap in the downtrack direction towards the peg. The pad extends into the write head away from the media-facing surface a distance L that is less than a corresponding distance of the peg coupler.

Figure 28:
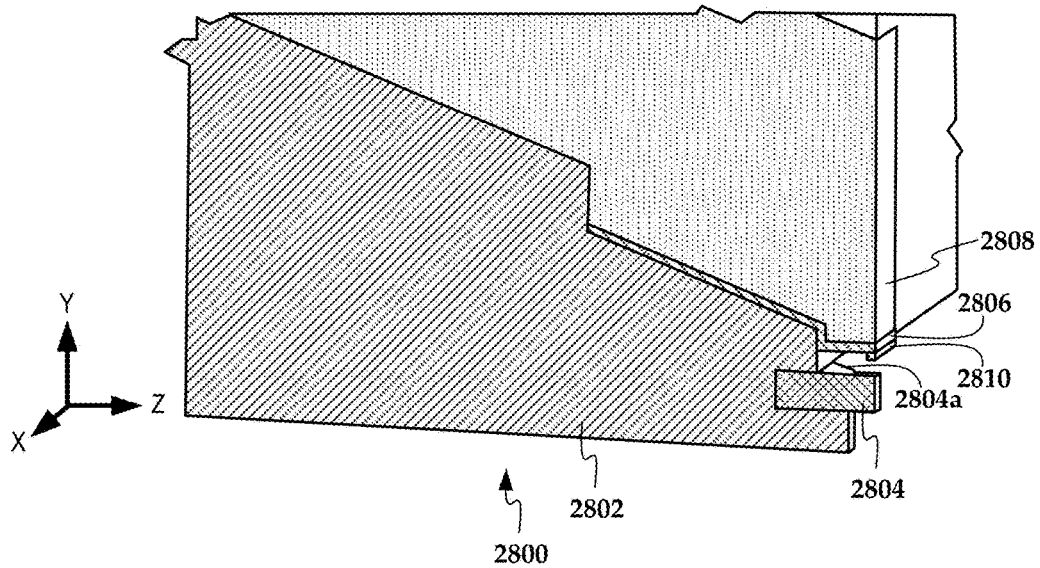
FIG. 28 is a cutaway view showing a near-field transducer with a peg coupler and pad according to an example embodiment.

In the embodiments described above, the NFT was generally shown or described as an enlarged portion (e.g., round disk, stadium shaped disk, rectangular plate) with a peg extending therefrom towards the media-facing surface. In FIG. 28, a cutaway view shows a particular NFT configuration used with a peg coupler and pad according to an example embodiment. This shows part of a head near an NFT 2800 that is cut along the center by a plane defined by the downtrack direction and light propagation directions (y-z plane). The NFT 2800 includes an enlarged portion 2802 and a peg 2804. The peg 2804 includes a flare 2804a, which acts as an anchor and is sunken into the enlarged portion 2802, which is configured as a disk. All or part of the peg 2804 is made of thermally robust material (Rh, Ir, Pt, Pd, etc.) and the enlarged portion 2802 is made of an efficient plasmonic resonator material (Au, Ag, Cu, etc.).

A peg coupler 2806 extends from a write pole 2808 towards the peg 2804. The peg coupler 2806 covers at least a bottom surface of the write pole 2602 that faces the NFT 2800. The peg coupler 2806 may be formed of a robust plasmonic material. A plasmonic metal pad 2810 is located between the NFT peg 2804 and the peg coupler 2806, extending into a gap between the NFT peg 2804 and the write pole 2808. The metal pad 2810 here is configured similarly to the example shown in FIG. 23, although in alternate embodiments may be configured as shown in any of the other figures. This configuration was found to increase thermal gradient 0.66 K/nm compared to a similar configuration without the metal pad 2810.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A write head comprising:
   a waveguide core;
   a magnetic pole; and
   a near-field transducer positioned at or near a media-facing surface and operatively coupled to the waveguide core, the near-field transducer comprising an enlarged portion and a peg extending from the enlarged portion towards the media-facing surface, the peg separated from the magnetic pole in a downtrack direction by a dielectric gap;
   a peg coupler covering a bottom surface of the magnetic pole near a tip of the magnetic pole and separated from the peg, the peg coupler formed of a first plasmonic material; and
   a pad that extends from the peg coupler into part of the gap in the downtrack direction towards the peg, the pad formed of a second plasmonic material and extending into the write head away from the media-facing surface a distance L that is less than a corresponding distance of the peg coupler.

2. The write head of claim 1, further comprising a heat sink extending from the enlarged portion of the near-field transducer to the magnetic pole, wherein the peg coupler, the pad, the heat sink, and the near-field transducer form an E-shaped cavity resonator that increases a thermal gradient of a hotspot created on a recording medium via the near-field transducer.

3. The write head of claim 1, wherein the pad has a crosstrack width that is the same as that of the peg coupler.

4. The write head of claim 1, wherein the pad has a crosstrack width that is the same as that of the peg.

5. The write head of claim 1, wherein the first and second plasmonic materials are selected from Ir, Rh, Pd, and Pt.

6. The write head of claim 1, wherein the first and second plasmonic materials are the same.

7. The write head of claim 1, wherein the near-field transducer heat sink is recessed from the media-facing surface by a distance TPH such that a magnitude of a downtrack electric field component on a down-track surface of the peg facing the peg coupler is greater than or equal to the downtrack electric field component on an opposing downtrack surface of the peg facing away from the peg coupler.

8. The write head of claim 7, wherein the peg extends a distance lPeg from the media-facing surface, TPH being greater than lPeg.

9. The write head of claim 1, wherein the waveguide core comprises a tapered end at the media-facing surface, the tapered end comprising a taper at an oblique angle to the media-facing surface, the taper facing away from the near-field transducer.

10. The write head of claim 9, wherein the tapered end reduces transverse mode coupling induced by the near-field transducer.

11. The write head of claim 1, wherein the pad comprises a sloped surface facing the near-field transducer, the sloped surface at an acute angle to the bottom surface of the magnetic pole.

12. The write head of claim 11, wherein the pad comprises a second surface joined to the sloped surface, the second surface proximate the media-facing surface and parallel to the bottom surface of the magnetic pole.

13. The write head of claim 1, wherein the pad comprises a major surface having a surface area greater than other surfaces of the pad that are not parallel to the major surface, the major surface parallel to the media-facing surface.

14. The write head of claim 1, wherein the pad comprises a major surface having a surface area greater than other surfaces of the pad that are not parallel to the major surface, the major surface parallel to the bottom surface of the magnetic pole.

15. A write head comprising:
   a waveguide;
   a magnetic pole; and
   a near-field transducer positioned at or near a media-facing surface and operatively coupled to the waveguide, the near-field transducer comprising a peg extending away the media-facing surface a distance lPeg, the peg separated from the magnetic pole by a dielectric gap;
   a heat sink between the near-field transducer and the write pole, the heat sink recessed from the media-facing surface by a distance TPH that is equal to or greater than the distance lPeg;
   a peg coupler covering a bottom surface of the magnetic pole near a tip of the magnetic pole and separated from the peg in the downtrack direction, the peg coupler formed of a first plasmonic material; and
   a pad that extends from the peg coupler into part of the gap in the downtrack direction towards the peg, the pad formed of a second plasmonic material and extending away from the media-facing surface a distance L that is less than a corresponding distance of the peg coupler.

16. The write head of claim 15, wherein the peg coupler, the pad, the heat-sink, and the near-field transducer form an E-shaped cavity that increases a thermal gradient of a hotspot created on a recording medium via the near-field transducer.

17. The write head of claim 15, wherein the pad has an arc-shaped surface facing the near-field transducer.

18. The write head of claim 15, wherein the recession of the heat sink from the media-facing surface by the distance TPH results in a magnitude of a downtrack electric field component on a down-track surface of the peg facing the peg coupler being greater than or equal to the downtrack electric field component on an opposing downtrack surface of the peg facing away from the peg coupler.

19. A method comprising:
   coupling light from a waveguide to a near-field transducer positioned at or near a media-facing surface, the near-field transducer comprising a peg extending towards the media-facing surface, the peg separated from a magnetic pole in a downtrack direction by a dielectric gap;
   forming a hotspot in a recording medium via the coupling of the light to the near-field transducer; and
   increasing a thermal gradient of the hotspot via a peg coupler and a pad that together form an E-shaped cavity of plasmonic material, the peg coupler covering a bottom surface of the magnetic pole near a tip of the magnetic pole and separated from the peg, the pad extending from the peg coupler into part of the gap in the downtrack direction towards the peg, the pad extending into the write head away from the media-facing surface a distance L that is less than a corresponding distance of the peg coupler.

20. The method of claim 19, wherein a heat sink is located between the near-field transducer and the magnetic pole, the heat sink comprising a recess from the media-facing surface by a distance TPH, the method comprising equalizing a magnitude of a downtrack electric field component on opposing downtrack surfaces of the peg via the recess of the heat sink.

* * * * *